United States Patent
Hertel et al.

(10) Patent No.: US 11,279,566 B2
(45) Date of Patent: Mar. 22, 2022

(54) CONVEYOR BELT ADJUSTING AND TRACKING METHOD AND AN ARRANGEMENT THEREFOR

(71) Applicant: IPCO SWEDEN AB, Sandviken (SE)

(72) Inventors: Patrik Hertel, Sandviken (SE); Thomas Engvall, Valbo (SE)

(73) Assignee: IPCO SWEDEN AB, Sandviken (SE)

( * ) Notice: Subject to any disclaimer, the term of this patent is extended or adjusted under 35 U.S.C. 154(b) by 0 days.

(21) Appl. No.: 17/287,764

(22) PCT Filed: Oct. 24, 2019

(86) PCT No.: PCT/EP2019/079102
§ 371 (c)(1),
(2) Date: Apr. 22, 2021

(87) PCT Pub. No.: WO2020/084090
PCT Pub. Date: Apr. 30, 2020

(65) Prior Publication Data
US 2021/0380347 A1    Dec. 9, 2021

(30) Foreign Application Priority Data
Oct. 25, 2018  (EP) ................................. 18202695

(51) Int. Cl.
*B65G 39/16*  (2006.01)
*B65G 15/64*  (2006.01)
(52) U.S. Cl.
CPC ............. *B65G 39/16* (2013.01); *B65G 15/64* (2013.01)
(58) Field of Classification Search
CPC .................................................... B65G 39/16
See application file for complete search history.

(56) References Cited

U.S. PATENT DOCUMENTS

| 2,160,057 A | * | 5/1939 | Carus | ............... | B65G 39/16 |
| | | | | | 198/806 |
| 3,973,446 A | * | 8/1976 | Vasilantone | ............ | B65G 39/16 |
| | | | | | 474/107 |

(Continued)

FOREIGN PATENT DOCUMENTS

| DE | 19704800 A1 | 8/1998 |
| GB | 608907 A | 9/1948 |

OTHER PUBLICATIONS

International Search Report and Written Opinion from corresponding International Patent Application No. PCT/EP2019/079102, dated Jan. 27, 2020, 13 pages.

*Primary Examiner* — Mark A Deuble
(74) *Attorney, Agent, or Firm* — Tucker Ellis LLP

(57) ABSTRACT

Method of adjusting and tracking an conveyor belt arranged around at least two rotatable drums, the belt having a direction of travel along its length and orthogonally an axis of the at least two drums, whereby the adjustment of the belt is made by displacing at least one of the drums sideways seen in the direction of travel of the belt and thus the belt so that the belt directly gets into a desired position. A conveyor belt tracking arrangement, the drums are arranged with their axles in a frame and at least one drum is arranged with its axle in a pivot frame and the pivot frame is in turn adjustably arranged in the frame, and movable by means of a drum moving force, which in turn makes the whole drum, with the belt, to move with the pivot frame around a pivot point provided in an orthogonal plane along the centre of the belt seen in the direction of the belt at a distance from the drum, so that the belt is directly moved to a desired position.

8 Claims, 7 Drawing Sheets

(56) References Cited

U.S. PATENT DOCUMENTS

| | | | | |
|---|---|---|---|---|
| 4,421,228 | A * | 12/1983 | Marsiglio | B65G 23/44 198/814 |
| 4,557,372 | A | 12/1985 | Rajagopal | |
| 4,959,040 | A * | 9/1990 | Gardner | B65G 39/16 198/807 |
| 6,267,228 | B1 * | 7/2001 | Cadwell | B65G 23/44 198/806 |
| 6,286,663 | B1 * | 9/2001 | Hartmann | B65G 39/16 198/806 |
| 6,584,900 | B2 * | 7/2003 | De Vroome | B65H 23/038 101/228 |
| 8,857,602 | B2 * | 10/2014 | Clevers | B41J 11/007 198/807 |
| 2003/0047424 | A1 * | 3/2003 | Monahan | B65G 39/16 198/806 |
| 2009/0090603 | A1 | 4/2009 | Ricciardi | |
| 2015/0232282 | A1 * | 8/2015 | Eagleson | B65G 39/16 198/806 |
| 2019/0291990 | A1 * | 9/2019 | Sasaki | B65H 7/02 |

* cited by examiner

CONVEYOR BELT ADJUSTING AND TRACKING METHOD AND AN ARRANGEMENT THEREFOR

The present invention concerns a method of adjusting and tracking a conveyor belt and an arrangement therefor, where the belt is arranged around at least two rotatable drums and the belt having a direction of travel along its length and orthogonally an axis of the at least two drums.

BACKGROUND

The method used to today for belt tracking of an conveyor around at least two drums is based on the idea that by means of a small angle adjustment of an axis of the drum the belt is caused to "wander" along its width until it reaches the desired position, whereby the angle adjustment is changed back to the desired angle for the drum where the belt keeps in the desired position. The position of the belt is monitored by means of at least one sensor. This works well when the belt moves with a normal velocity and the tolerance on the desired position is normal.

However new demands on fast moving belts with high accuracy have arisen, for example in the printing technology using ink printing. When printing pictures on blanks for packaging, for example, the accuracy is of utmost importance.

SUMMARY OF THE INVENTION

The aim of the present invention is to provide a method which will meet the new demands of accuracy while the belt is driven with a high velocity. As an example, a belt should be able to be driven around 200 m/min or more. Preferably, the displacement should not be more than 0.05 mm.

According to a first aspect of the invention a method of adjusting and tracking a conveyor belt arranged around at least two rotatable drums is provided. The belt has a direction of travel along its length and orthogonally an axis of the at least two drums. The adjustment of the belt is made by displacing at least one of the drums sideways seen in the direction of travel of the belt and thus also the belt so that the belt directly gets into a desired position. By moving the belt directly into the desired position, by means of the displacement of the drum, a direct adjustment can be made without delay instead of the method according to the known art where the belt is indirectly adjusted into the desired position by the angle change of the drum causing the belt to wander to the desired position.

According to an embodiment of the method, the displacement of the at least one drum and the belt sideways is a rotational movement of the at least one drum about a pivot point provided in an orthogonal plane along the centre of the belt, in the direction of the belt, at a distance from the at least one drum. In the known art the pivot point instead is positioned at a distance outside at least one of the ends of the drum in a thought line aligned with an axis of the drum.

According to an embodiment of the method, the distance is at least as long as the width of the belt. An advantage with this is that the rotational movement will have a large radius and thus a flat curvature so that the arranging of a drum axle in a frame will be easily achieved.

According to an embodiment of the method, the pivot point is positioned at a chosen position anywhere 360 degrees around an axis of the at least one drum.

According to an embodiment of the method, the at least one drum is moved back to a desired position of the drum without changing the position of the belt by compensating the desire of the belt to move sideways in the same direction as the at least one drum was moved by moving the at least one drum back towards the desired position of the drum, continuously. It can also be described as indirectly causing the belt to move in the same direction as the drum was moving (forward) when the correction of the belt position was made but at the same time withdrawing the drum, i.e. moving the drum back at the same speed as the belt is moving backwards back to the desired position for the drum, so that the belt actually keeps its desired position.

According to an embodiment of the method, sensing of the belt position is monitored constantly as well as the speed of the belt. This is preferably done using at least one sensor, for example a touchless sensor.

According to a second aspect of the invention a conveyor belt adjusting and tracking arrangement is provided comprising an belt provided around at least two rotatable drums. The belt having a direction of travel along its length and orthogonally an axis of the at least two drums. The drums are arranged with their axles in a frame and at least one drum is arranged with its axle in a pivot frame and the pivot frame is in turn adjustably arranged in the frame. The pivot frame is movable by means of a drum moving force, which in turn makes the whole drum, with the belt, arranged in the pivot frame to move with the pivot frame around a pivot point provided centrally of the belt seen in the direction of the belt at a distance from the drum, thus the belt is directly moved to a desired position.

According to an embodiment of the arrangement, the at least one drum is movable along a portion of an arc drawn up around the pivot point.

According to an embodiment of the arrangement, a flexible beam protrudes from the pivot frame in the same direction as the belt and is attached in its other end in the frame.

SHORT DESCRIPTION OF THE DRAWINGS

The present invention will now be described in more detail by means of different embodiments under referral to the enclosed drawings, wherein FIG. 1a-c shows a series of figures showing different positions during the use of the method according to the invention.

DETAILED DESCRIPTION OF EMBODIMENTS OF THE INVENTION

Figure 1A:
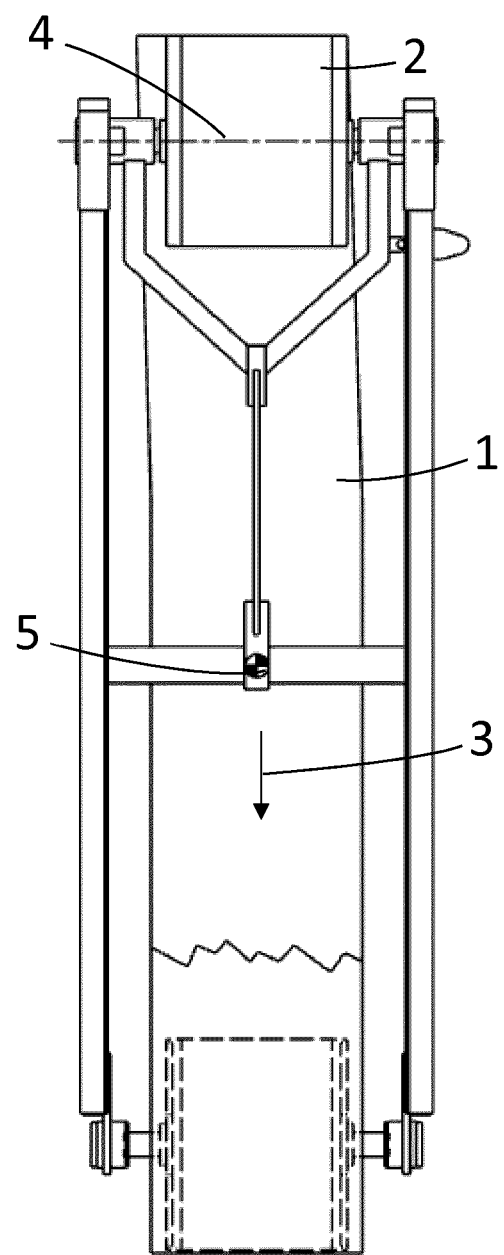
Figure 1B:
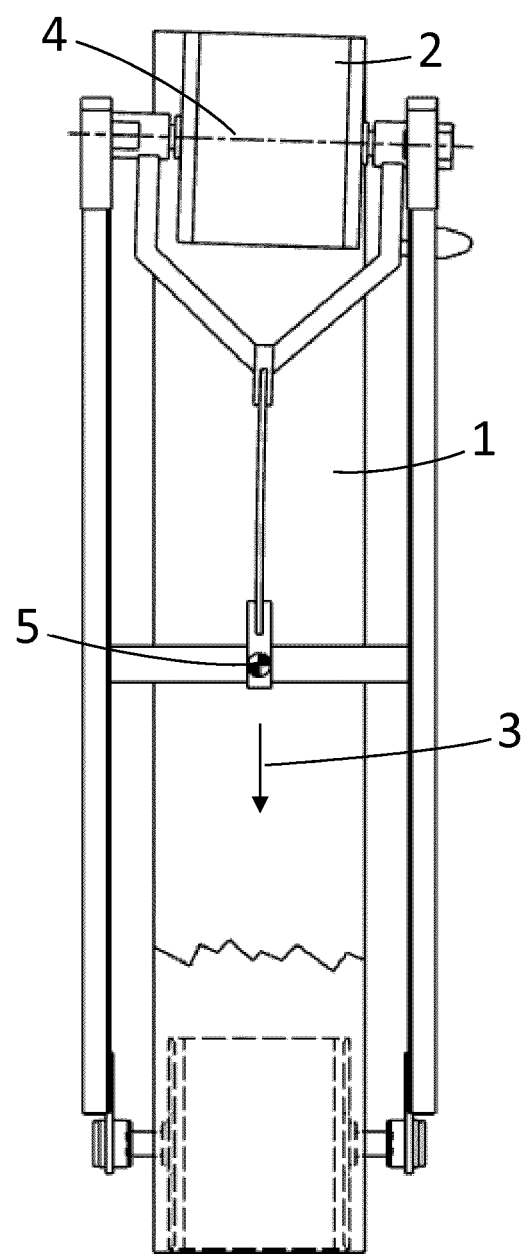

The method will now be described under referral to FIGS. 1a-c. In FIG. 1 a conveyor belt 1 is shown when it is passing two rotatable drums 2. For the sake of clarity, the top portion of the belt 1 in the conveyor is broken away so that details of the invention and corresponding drum 2 is shown. The second drum is hidden by the belt but illustrated with broken lines. The same is done in FIGS. 1-4. The travelling direction 3 of the belt 1 is orthogonal to an axis w 4 of the drum 2. For one reason or the other, the belt 1 is not in the desired position. Therefore, the drum 2 is displaced sideways, relative the movement forward of the belt 1, bringing the belt 1 with it so that the belt 1 comes into the desired position directly. See FIG. 1b where the belt 1 is in the desired position and the drum 2 is displaced sideways.

Figure 1C:
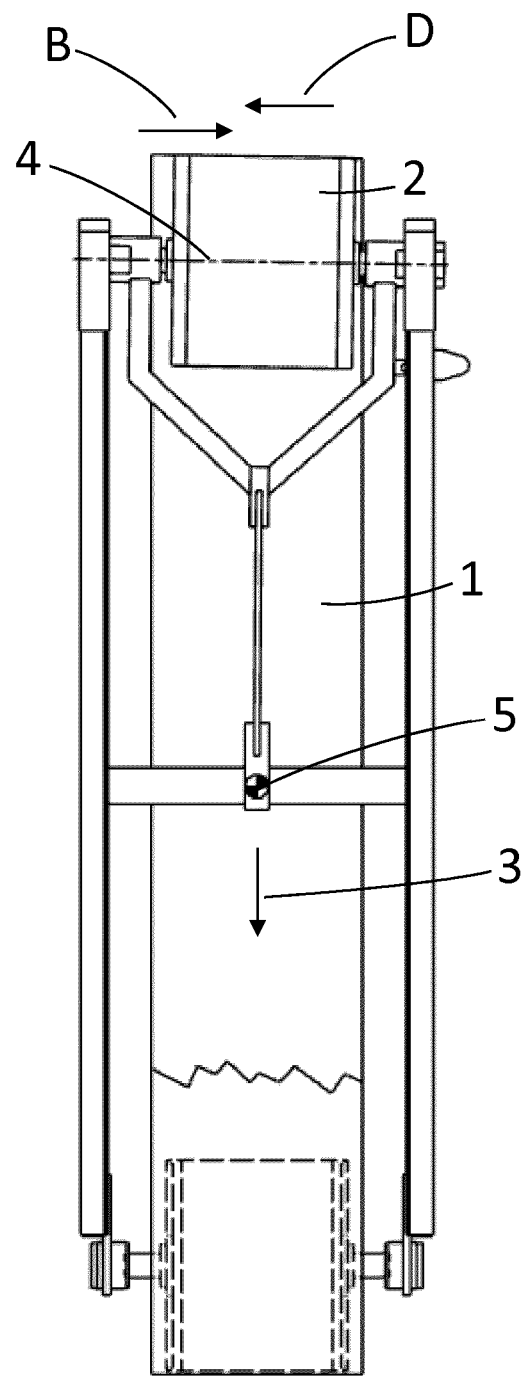

Now the drum 2 must be brought back to its desired position otherwise the belt 1 will start wandering sideways in the same direction as the drum 2 has been displaced, see the arrow B in FIG. 1c. Therefore, the drum 2 will be moved back, see arrow D, towards the desired position of the drum 2 at the same velocity as the belt 1 will wander in the opposite direction. Thus, the belt 1 will still be in the same desired position by the compensating movement back of the drum 2. When the drum 2 has reached its desired, normal position the belt 1 will not wander in any direction. Hence, both the belt 1 and the drum 2 are in their desired positions. Preferably, the sideways movement or displacement of the drum 2 is a rotational movement about a pivot point 5 provided in an orthogonal plane along the centre of the belt 1 seen in the travel direction 3, at a distance from the drum 2. See for example FIGS. 3 and 4.

The distance between the drum 2 and the pivot point 5 is preferably so long that an arc shaped travel path 6 for displacement of the drum 2 sideways will be as flat as possible, i.e. have a large radius. Preferably, the distance is at least as long as the width of the belt 1. The pivot point 5 may be positioned in an orthogonal plane along the centre of the belt seen in the travel direction and anywhere around the circumference of the drum 2. For example, it may be provided vertically above the drum 2 or horizontally close to the belt 2 or in the thought elongation of the belt 1 if the belt was not deflected by the drum 2.

The position of the belt 1, drum 2 and the velocity of the belt 1 are monitored and controlled by means by a PLC, Programmable Logic Controller 21.

Different embodiments of a conveyor belt adjusting and tracking arrangement will now be described in more detail referring to FIGS. 2-5. An embodiment of a conveyor belt adjusting and tracking arrangement comprises an belt 1 provided around at least two rotatable drums w 2. Obviously, the belt 1 may pass several drums 2 depending on the application. The belt 1 has a direction of travel 3 along its length and orthogonally an axis 4 of the at least two drums 2.

The drums 2 are arranged with their axles 7 in a frame 8 and at least one drum 2 is arranged with its axle 7 in a pivot frame 9 and the pivot frame 9 is in turn adjustably arranged in the frame 8 or the axle 7 reaches into the frame 8. It is conceivable to have more than one drum 2 having a pivot frame 9 so that more than one drum 2 is displaceable in the conveyor belt adjusting and tracking arrangement. The pivot frame 9 is movable by means of a drum moving force 10, shown as an arrow in FIG. 2, which in turn makes the whole drum 2, with the belt 1, arranged in the pivot frame 9 to move with the pivot frame 9 around a pivot point 5 provided in an orthogonal plane along the centre of the belt 1 seen in the direction of the belt 1 at a distance from the drum 2. Thus the belt 1 is directly moved to a desired position.

Figure 2:
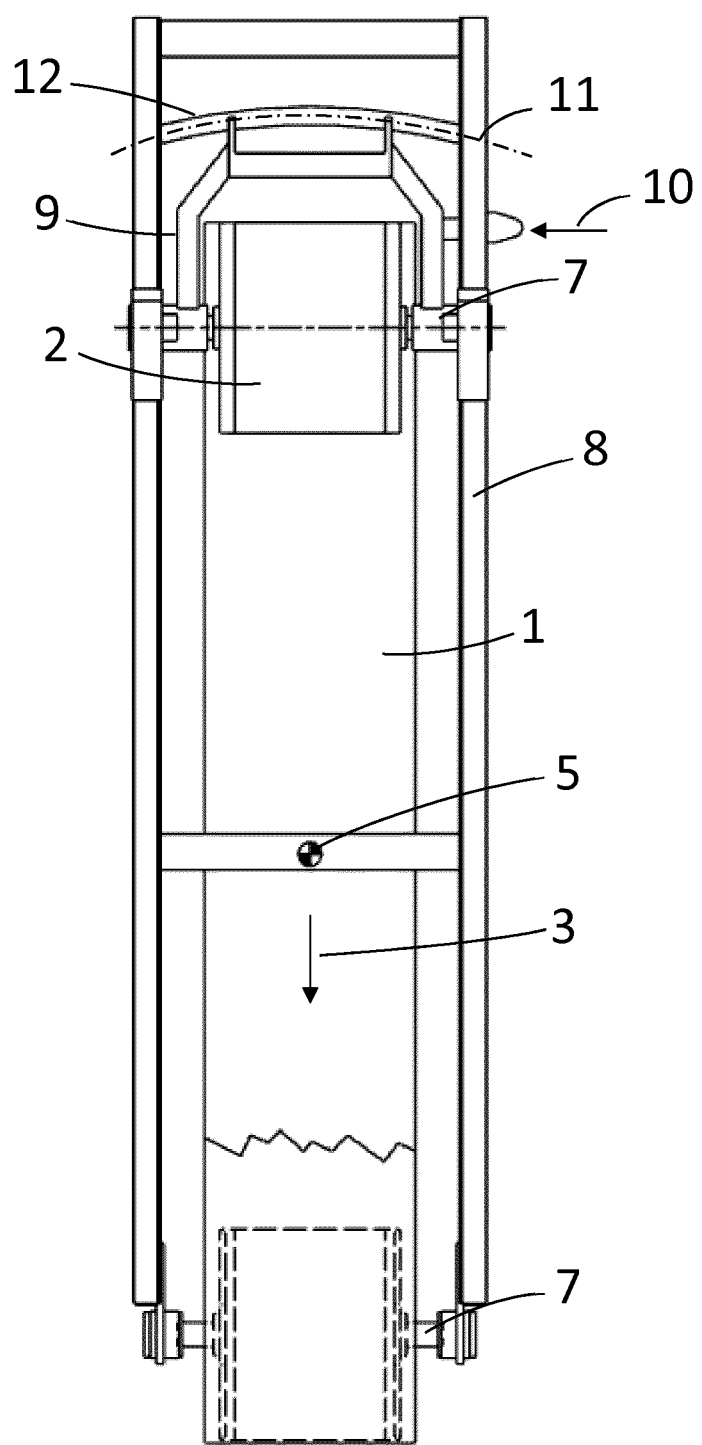
FIG. 2 shows an embodiment of the present invention having an arc shaped travel path for a drum.

In the embodiment shown in FIG. 2 the pivot frame 9 moves along a portion of an arc 11 drawn up around the pivot point 5. For example, the pivot frame 9 may travel in a slot 12 along the portion of the arc 11. Obviously other support solutions are conceivable for moving the pivot frame 9 along the portion of the arc 11.

Figure 3:
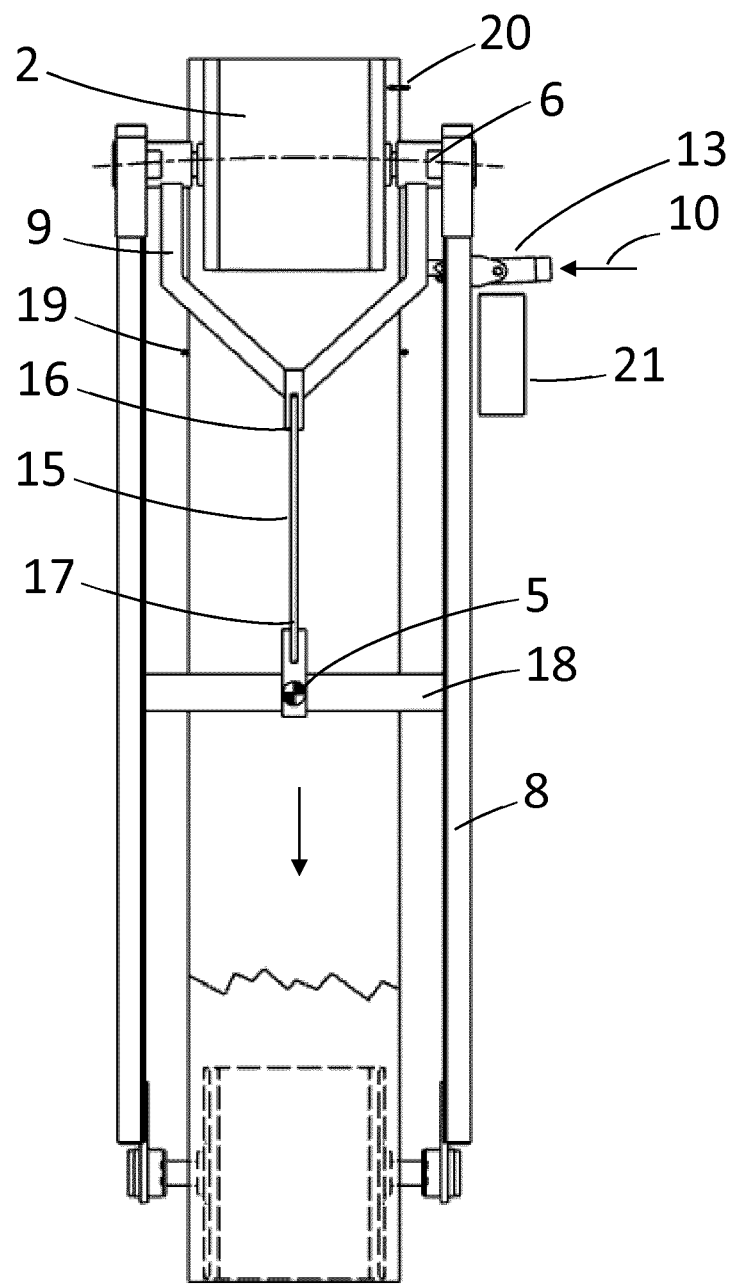
FIG. 3 shows an embodiment of the present invention having a pivot frame connected to the frame via a flexible beam.

In the embodiment shown in FIG. 3 the drums 2 are arranged with their axles 7 in a frame 8 and at least one drum 2 is arranged with its axle 7 in a pivot frame 9 and the pivot frame 9 is in turn adjustably arranged in the frame 8 or the axle 7 reaches into the frame 8. It is conceivable to have more than one drum 2 having a pivot frame 9 so that more than one drum 2 is displaceable in the conveyor belt adjusting and tracking arrangement. But in the embodiment shown in FIG. 3 only one drum 2 is adjustable.

The pivot frame 9 is movable by means of a drum moving force 10, shown as an arrow in FIG. 3, which in turn makes the whole drum 2, with the belt 1, arranged in the pivot frame 9 to move with the pivot frame 9 around a pivot point 5 provided centrally of the belt 1 seen in the direction of the belt 1 at a distance from the drum 2, thus the belt 1 is directly moved to a desired position. The drum moving force 10 may be provided by a positioning means or actuator 13 attached in the frame 8 pushing or retracting the pivot frame 9 in relation to the frame 8.

The pivot frame 9 is arranged at the two axle ends 7 of the drum and runs therebetween outside of the drum 2. Centrally of the pivot frame, between the axle ends 7, a beam 15 is attached in its first end 16, more or less orthogonally to the drum axle 7. Preferably, the beam 15 is flexible in an elastic manner. The beam is attached in its second end 17 in the frame 8, for example in an orthogonal portion 18 of the frame 8. The attachment could either be a fixed attachment or a flexible attachment, such as a hinge-like attachment. The attachment provides the pivot point 5 for the pivot frame 9.

The beam 15, especially if it is flexible in an elastic way, gives a gap free connection between the drum 2 and the frame 8, since it will bring tensional force to the sideways movements of the drum 2.

The position of the belt 1 is monitored by means of at least one sensor 19, preferably a touchless sensor. The sensor 19 is preferably provided in the vicinity of the displaceable drum 2. Also, the velocity of the belt 1 may be monitored by means of speed sensor 20. A PLC 21 is arranged and in connection with both the position sensor 19 and the speed sensor 20. The PLC 21 handle and store relevant data and may be programmed to move the drum 2 back and forth sideways along the arc shaped travel path 6 by means of the actuator 13.

Figure 4:
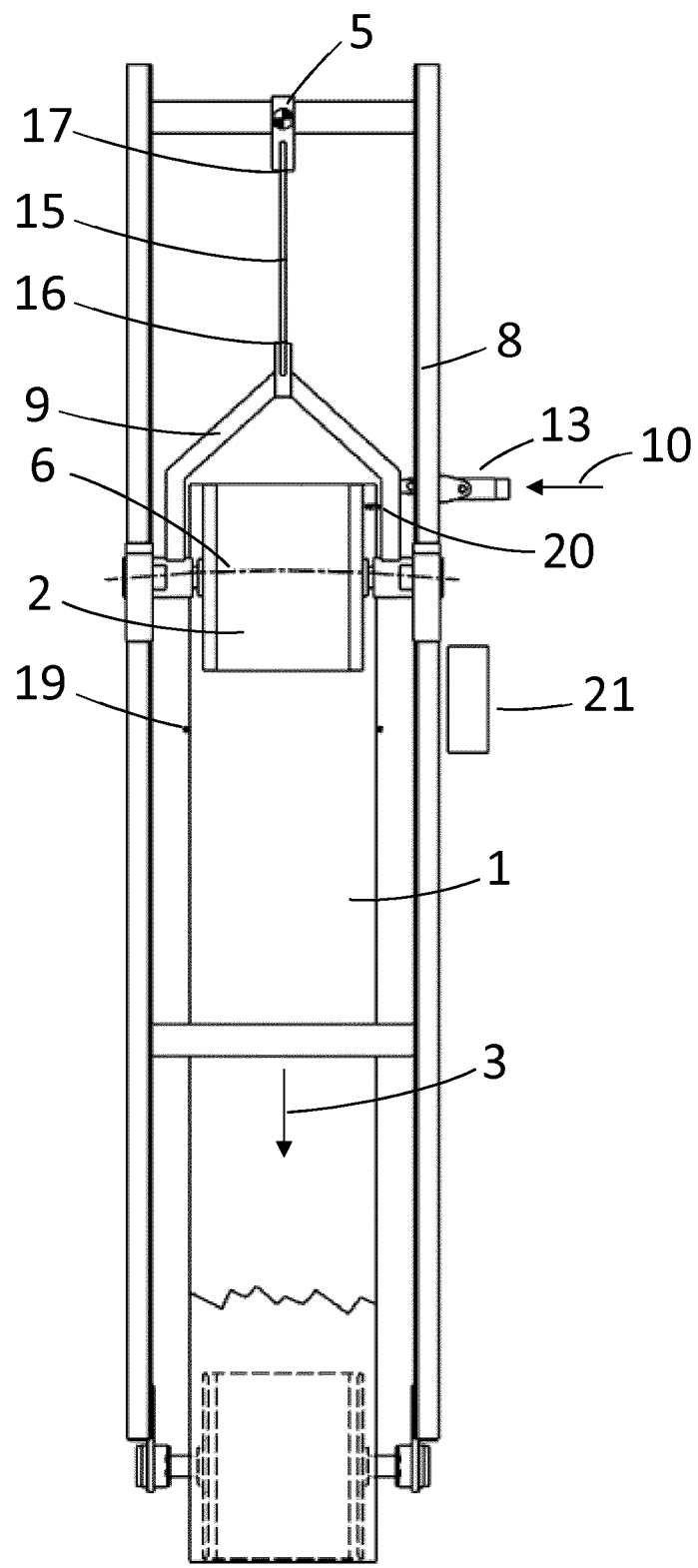
FIG. 4 shows another embodiment of the present invention having a pivot frame connected to the frame via a flexible beam.

In FIG. 4 another embodiment is shown where the beam 15 is arranged in another direction, in an opposite direction to the embodiment of FIG. 3, more or less in the prolongation of the belt 1 outside the drum 2 so that the frame 8 will be extended in the same direction. Thus, the pivot point 5 will be arranged 180 degrees from the pivot point 5 of the embodiment of FIG. 3.

Figure 5:
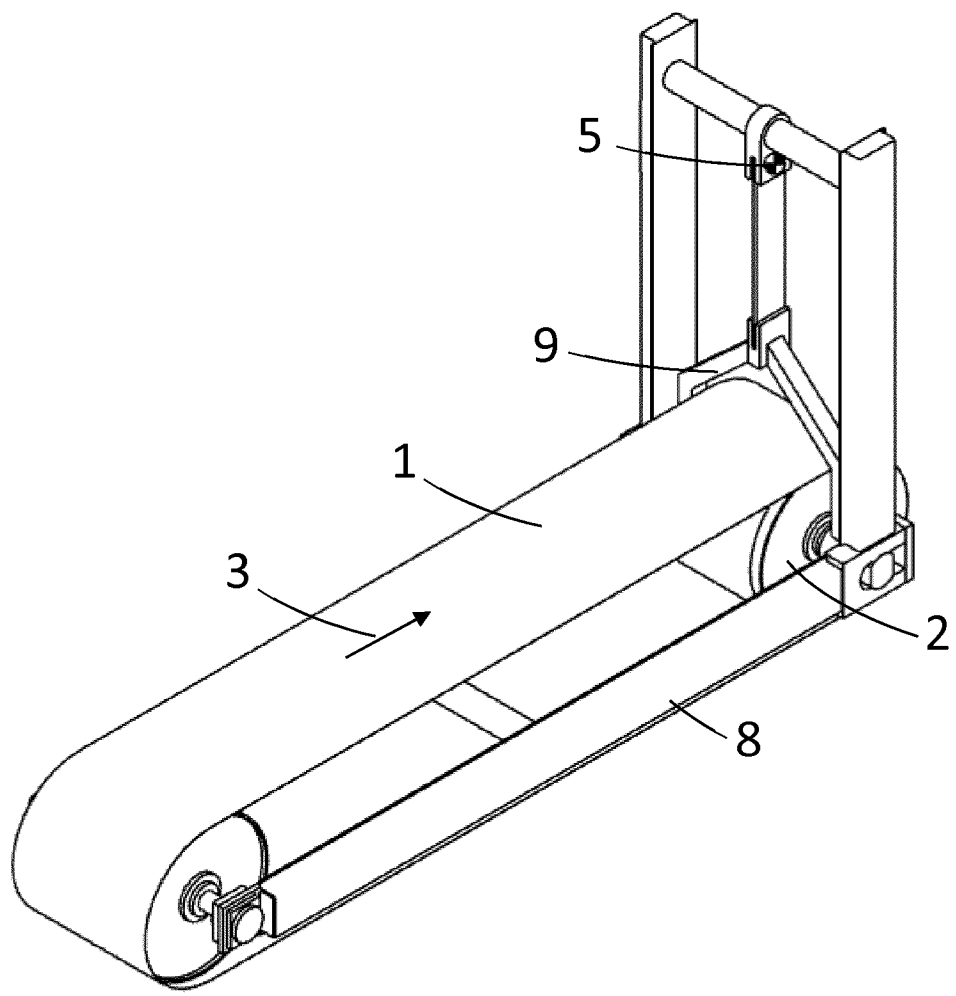
FIG. 5 shows a further embodiment of the present invention having a pivot frame connected to the frame via a flexible beam.

As previously noted, the pivot point 5 may be arranged at any positional degree around an axis of the drum 2. Another embodiment is shown in FIG. 5 where the pivot point 5 instead is arranged above the drum 2. In this case an extension upwards of the frame 8 is provided.

It is preferred that the actuator 13 is able to quickly and with high precision move the pivot frame 9 and thus the drum 2.

The invention claimed is:

1. A method of adjusting and tracking a conveyor belt arranged around at least two rotatable drums, the belt having a direction of travel along its length and orthogonal to respective axes of the at least two drums, the adjustment of the belt is made by displacing at least one of the drums sideways seen in the direction of travel of the belt and so that the belt directly gets into a desired position, and wherein the at least one drum is moved back to a desired position of the drum without changing the position of the belt by compensating the tendency of the belt to move sideways in the same direction as the at least one drum was moved by moving the at least one drum back towards the desired position of the drum, continuously, in the same velocity as the belt will wander in the opposite direction.

2. The method according to claim 1, wherein the displacement of the at least one drum and the belt sideways is a rotational movement of the at least one drum about a pivot point provided in a plane orthogonal to the direction of travel of the belt along the centre of the belt in the direction of travel of the belt at a distance from the at least one drum.

3. The method according to claim 2, wherein the distance is at least as long as the width of the belt.

4. The method according to claim 2, wherein the pivot point is positioned at a chosen position anywhere 360 degrees around an axis of the at least one drum.

5. The method according to claim 1, wherein the belt position and the speed of the belt are constantly monitored.

6. A conveyor belt adjusting and tracking arrangement, comprising an belt provided around at least two rotatable drums, the belt having a direction of travel along its length and orthogonal to respective axes of the at least two drums, which drums are arranged with their axles in a frame and at least one drum is arranged with its axle in a pivot frame and the pivot frame is in turn adjustably arranged in the frame, the pivot frame is movable by means of a drum moving force, which in turn makes the whole drum, with the belt, arranged in the pivot frame move with the pivot frame around a pivot point provided in a plane orthogonal to the direction of travel of the belt along the centre of the belt seen in the direction of travel of the belt at a distance from the drum, so that the belt is directly moved to a desired position, and wherein the at least one drum is moved back to a desired position of the drum without changing the position of the belt by compensating the tendency of the belt to move sideways in the same direction as the at least one drum was moved by moving the at least one drum back towards the desired position of the drum, continuously, in the same velocity as the belt will wander in the opposite direction.

7. The conveyor belt adjusting and tracking arrangement according to claim 6, wherein the at least one drum is movable along a portion of an arc drawn up around the pivot point.

8. The conveyor belt adjusting and tracking arrangement according to claim 6, wherein a flexible beam protrudes from the pivot frame in the same direction as the belt and is attached at a distal end to the frame.

* * * * *